Patented Oct. 30, 1951

2,573,586

UNITED STATES PATENT OFFICE 2,573,586

RECOVERY OF PROCAINE

John Talbot McCombie, Walton-on-the-Hill, Paul Frederick Ernest Mann, London, and Anthony Musgrave Wild, Cheam, England, assignors to The Distillers Company Limited, Edinburgh, Scotland, a British company No Drawing. Application June 15, 1950, Serial No. 168,376. In Great Britain July 1, 1949

6 Claims. (Cl. 260—472)

The present invention relates to an improved process for the recovery of procaine from aqueous solutions thereof.

Procaine is a trade name given to the compound beta - diethylamino - ethyl - para - aminobenzoate-hydrochloride, also known under the names novocaine, ethocaine, kerocaine, syncaine and neocaine, and which compound is used as a local anaesthetic. Procaine penicillin which is the salt formed by the reaction of procaine and a salt of penicillin is a compound of considerable therapeutic value.

In the manufacture of procaine penicillin, and particularly in processes for the conversion of procaine penicillin to other salts of penicillin, as described in our copending United States application Ser. No. 133,944, dated December 19, 1949, large volumes of aqueous solutions containing small, i. e. about 5% or less, amounts of procaine are obtained and the provision of a simple and efficient process for the recovery of procaine from such solutions represents a substantial feature in the economical operation of these processes.

It is not expedient to recover the procaine from such solutions by simple evaporation since the aqueous penicillin solutions obtained in this way contain gummy, coloured and other impurities which would be associated with the procaine thus obtained, and moreover procaine itself is not very heat stable and by evaporation of large volumes of aqueous solutions thereof, even under reduced pressure a certain amount of decomposition will take place. In addition evaporation in this way under reduced pressure is a relatively costly process.

Accordingly, it is an object of the present invention to provide a simple and efficient process for the recovery of procaine from dilute aqueous solutions thereof as obtained in processes for the manufacture of penicillin derivatives.

The method for the recovery of the procaine employed according to the present invention is to adjust the pH of the aqueous procaine-containing solution to a value greater than about 8 to precipitate the procaine in the form of its free base. As indicated above, the procaine solutions also contain undesirable impurities which would co-precipitate with the procaine base and, accordingly, therefore, the aqueous procaine solution is treated with a small amount of activated carbon to remove these impurities. It has been found, however, that by carbon treatment of the solution in this way a substantial amount—in some cases up to about 40% by weight of the carbon—of procaine may be adsorbed on the carbon, and also that when washing the carbon with organic solvents to remove the adsorbed procaine, although satisfactory removal of the procaine is effected the impurities adsorbed on the carbon are also removed in this way. We have found that if the carbon is washed with a small amount of a dilute aqueous mineral acid of normality not greater than about 2, substantially all the procaine is removed without carrying with it any substantial amount of the gummy and other impurities adsorbed on the carbon.

According to the process of the present invention an aqueous procaine-containing solution at a pH less than about 8 is contacted with a small amount of activated carbon, the solution separated and the carbon washed with aqueous dilute acid of normality not greater than about 2, the filtrate and the washings obtained being adjusted to a pH greater than 8 and preferably between 10 and 12, thus precipitating the procaine in the form of the base beta-di-ethylaminoethyl-para-aminobenzoate.

The carbon treatment of the procaine solution is most suitably effected by agitating with the solution activated carbon in amount of the order of about 1% by weight of the solution, suitably for a period of ½ to 1 hour, the pH of said solution being less than about 8, filtering off the carbon which will retain much of the gummy, coloured and other impurities associated in the solution with the procaine and thereafter washing the filter cake of carbon with a small amount of a dilute aqueous mineral acid of normality not greater than about 2. This carbon treatment can also be effected by passing the aqueous procaine-containing solution through a static mass of activated carbon, suitably contained in a column.

The mineral acids which it is preferred to employ for washing the activated carbon include hydrochloric acid and sulphuric acid. It should be noted that the use of phosphoric acid should be avoided as this may result in the precipitation of phosphate salts during the subsequent precipitation of the procaine base, unless the final pH of the solution is not in excess of 10–10.5 and the temperature is maintained at or below room temperature.

The precipitation of the procaine from the purified aqueous solution, in the form of the corresponding base, by adjusting the pH to a value greater than 8, and preferably between 10 and 12, is very suitably effected by the addition of aqueous sodium hydroxide, although it should be noted that other alkaline agents may also be employed. It has been found that when the pH of the solution is 9.0 the procaine base of a purity of about 95% is precipitated in a yield of the order of 80%, whereas if the pH of the solution is adjusted to between 10 and 12 the purity of the precipitated procaine base has been found to be about 98% and the yield to be of the order of 95 to 100% by weight.

According to a preferred modification of the present invention whereby improved results may be obtained the aqueous procaine-containing solution is extracted with a substantially immiscible organic solvent such as amyl acetate, butyl acetate, chloroform, ether and the like, after adjustment of the pH of the solution to a value greater than 8, and preferably between 10 and 12, the organic solvent extract being separated and then re-extracted with water at a pH of less than 6 and preferably about 2, the aqueous extract obtained being separated and the pH thereof adjusted to a value greater than 8 and preferably between 10 and 12, thus precipitating the procaine base.

It has been found that when employing this modification of the invention the procaine is recovered in slightly greater yields and in a purer form, and advantages obtained that concentration of the procaine-containing solution is obtained, with consequent reduction in the volume of solution being treated and also the extraction steps ensure the removal of mineral and other salts which may be associated with the procaine, and which might otherwise be precipitated with the procaine base. This extraction treatment may take place before or after the carbon treatment of the procaine-containing solution.

The following examples are given to illustrate the process of the present invention. The parts by weight and parts by volume bear the same relation to each other as do grams to millilitres.

*Example 1*

500 parts by volume of an aqueous solution of a pH of 7–8, obtained in the process for the conversion of procaine penicillin to sodium penicillin as described in our copending United States application Ser. No. 133,944, dated December 19, 1949, containing 9.75 parts by weight of procaine, are treated with 1% by weight of activated carbon with agitation and the carbon filtered off. The carbon filter cake is washed with 140 parts by volume of dilute hydrochloric acid of pH 1 and these washings combined with the filtrate, the resulting solution being adjusted to pH 11 by the addition of aqueous sodium hydroxide and then shaken successively with three portions, each 50 parts by volume, of butyl acetate; the butyl acetate extracts being separated and bulked. This extract is reextracted with 50 parts by volume of water at pH 2, the aqueous extract separated and the pH adjusted to 11 by the addition of aqueous sodium hydroxide. 8.8 parts by weight of procaine base are precipitated in a purity of 99.2% by weight, representing an overall yield of 89%.

*Example 2*

5,000 parts by volume of procaine-containing liquors are treated with 20% by weight aqueous sodium hydroxide to adjust the pH of the solution to 7–8, and 50 parts by weight of finely ground activated carbon are added thereto, the mixture stirred for 1 hour and then filtered. The carbon filter cake is washed with 1,000 parts by volume of 1.0 N hydrochloric acid and these washings added to the filtrate. 300 parts by volume of butyl acetate are added to the bulked solution and 20% by weight aqueous sodium hydroxide added to the mixture with stirring in amount such that the solution is finally of pH 11. The solvent and aqueous layers are separated and the aqueous phase further extracted with two 300 parts by volume portions of butyl acetate. The butyl acetate extracts obtained are bulked and re-extracted with three 150 parts by volume portions of water at an equilibrium pH of 2–2.5 obtained by the addition of hydrochloric acid. Finally, the aqueous extracts thus obtained are combined and 20% by weight aqueous sodium hydroxide added slowly thereto with stirring until precipitation of the procaine base just commences, whereupon crystallisation thereof is induced by seeding, followed by the further slow addition of the aqueous sodium hydroxide to a final pH of 10.5. The precipitated procaine base is separated by filtration, washed and dried giving an 87% recovery of white procaine base of 96% purity by weight.

*Example 3*

500 parts by volume of an aqueous solution of procaine of a pH in the range 2–3, containing 9.75 parts by weight of procaine are treated with 1% by weight of activated carbon with agitation for half an hour and the carbon filtered off. The carbon filter cake is washed with 140 parts by volume of dilute sulphuric acid of pH 1 and these washings being combined with the filtrate, the resulting solution adjusted to pH 11 by the addition of aqueous sodium hydroxide and then shaken successively with three portions, each 50 parts by volume, of butyl acetate, the butyl acetate extracts being separated and bulked. This extract is re-extracted with 50 parts by volume of water at pH 2, the aqueous extract separated and the pH adjusted to 11 by the addition of sodium hydroxide. 8.8 parts by weight of procaine base are precipitated in a purity of 97.5% by weight representing an overall yield of 87%.

*Example 4*

500 parts by volume of an aqueous solution of procaine of a pH in the range of 7–8, containing 9.75 parts by weight of procaine are treated with 1% by weight of activated carbon with agitation for half an hour to an hour and the carbon filtered off. The carbon filter cake is washed with 140 parts by volume of dilute sulphuric acid of pH 1 and these washings combined with the filtrate. The combined solution is adjusted to pH 10.5 by the addition of aqueous sodium hydroxide and 8.6 parts by weight of procaine base of purity 95.2% by weight are precipitated representing an overall yield of 84%.

On repeating the process of this example, with the exception that the original solution of procaine is adjusted to a pH in the range 2–3 before the carbon treatment, 8.5 parts by weight of procaine base of purity, 96.6% by weight are precipitated representing an overall yield of 84.1%.

We claim:

1. A process for the recovery of procaine which comprises contacting an aqueous solution of procaine at a pH less than about 8 with activated carbon, separating the aqueous solution, washing the activated carbon with an aqueous dilute acid of normality not greater than about 2 and thereafter adjusting the pH of the carbon treated aqueous solution and the carbon washings to a value greater than 8 and recovering the precipitated procaine base.

2. A process as claimed in claim 1, wherein the aqueous solution of procaine is agitated with activated carbon in amount about 1% by weight of the solution.

3. A process as claimed in claim 1, wherein the aqueous solution of procaine is passed through a static mass of activated carbon.

4. A process as claimed in claim 1, wherein the activated carbon is washed with an aqueous acid selected from the group consisting of hydrochloric acid and sulphuric acid.

5. A process as claimed in claim 1, wherein the pH of the carbon treated aqueous solution and the carbon washings is adjusted to a pH in the range 10–12.

6. A process for the recovery of procaine which comprises contacting an aqueous solution of procaine at a pH less than 8 with activated carbon, separating the aqueous solution, washing the activated carbon with an aqueous dilute acid of normality not greater than about 2, extracting the procaine from the carbon-treated aqueous solution and the carbon washings after adjustment of the pH to a value in excess of 8 with a substantially water-immiscible organic solvent for procaine base, re-extracting said organic solvent extract with water at a pH less than 6, separating the aqueous re-extract, adjusting the pH to a value greater than 8 and recovering the precipitated procaine base.

JOHN TALBOT McCOMBIE.
PAUL FREDERICK ERNEST MANN.
ANTHONY MUSGRAVE WILD.

No references cited.